US012603718B2

(12) United States Patent
Bohm

(10) Patent No.: US 12,603,718 B2
(45) Date of Patent: Apr. 14, 2026

(54) ROBUST TIME DISTRIBUTION AND SYNCHRONIZATION IN COMPUTER AND RADIO ACCESS NETWORKS

(71) Applicant: Net Insight AB, Solna (SE)

(72) Inventor: Christer Bohm, Nacka (SE)

(73) Assignee: Net Insight AB, Solna (SE)

( * ) Notice: Subject to any disclaimer, the term of this patent is extended or adjusted under 35 U.S.C. 154(b) by 312 days.

(21) Appl. No.: 18/258,694

(22) PCT Filed: Feb. 15, 2022

(86) PCT No.: PCT/EP2022/053589
§ 371 (c)(1),
(2) Date: Jun. 21, 2023

(87) PCT Pub. No.: WO2022/175226
PCT Pub. Date: Aug. 25, 2022

(65) Prior Publication Data
US 2024/0048261 A1 Feb. 8, 2024

(30) Foreign Application Priority Data
Feb. 22, 2021 (SE) .................................... 2150183-8

(51) Int. Cl.
*H04J 3/06* (2006.01)
*G04R 20/02* (2013.01)

(52) U.S. Cl.
CPC ............ *H04J 3/0667* (2013.01); *G04R 20/02* (2013.01); *H04J 3/0641* (2013.01)

(58) Field of Classification Search
CPC ... H04B 7/2687; H04B 7/2693; H04J 3/0644;

H04J 3/0667; H04J 3/0638; H04J 3/0641;
G04R 20/02; H04L 7/00; H04L 69/28;
H04W 56/001; H04W 56/0015; H04W
56/004; H04W 88/08
See application file for complete search history.

(56) References Cited

U.S. PATENT DOCUMENTS

| | | | |
|---|---|---|---|
| 8,502,180 B2 * | 8/2013 | Bouchard | G01N 21/8901 |
| | | | 250/559.4 |
| 9,439,055 B2 * | 9/2016 | Kusui | H04W 4/02 |
| 9,973,601 B2 * | 5/2018 | Spada | H04L 69/28 |

(Continued)

FOREIGN PATENT DOCUMENTS

| | | |
|---|---|---|
| EP | 1601124 A1 | 11/2005 |
| WO | WO-2009077512 A1 | 6/2009 |

OTHER PUBLICATIONS

Swedish Search Report for Swedish patent application No. 2150183-8 dated Nov. 18, 2021.

(Continued)

*Primary Examiner* — Bailor C Hsu
(74) *Attorney, Agent, or Firm* — Harness, Dickey & Pierce, P.L.C.

(57) ABSTRACT

The present invention relates to systems, methods and nodes for enabling synchronization between a plurality of nodes in a network, by comparing the times of the GPS clocks of the plurality of nodes to determine accurate clocks being within a tolerance of each other, adjusting priority, and, if the priority of a local clock of a node is low, selecting a remote GPS clock to be used as a timing reference of the GPS clock of the node.

13 Claims, 8 Drawing Sheets

(56) References Cited

U.S. PATENT DOCUMENTS

| | | | |
|---|---|---|---|
| 10,158,441 B1 * | 12/2018 | Butterworth ...... | H04W 56/0015 |
| 10,721,697 B2 * | 7/2020 | Li ..................... | H04W 56/0015 |
| 11,750,698 B2 * | 9/2023 | Lv ......................... | H04J 3/0638 |
| | | | 709/248 |
| 2009/0122782 A1 | 5/2009 | Horn et al. | |
| 2011/0016343 A1 * | 1/2011 | Hoch ................... | H04J 3/0644 |
| | | | 713/400 |
| 2014/0003542 A1 * | 1/2014 | Zukerman ............ | H04J 3/0641 |
| | | | 375/259 |
| 2014/0140456 A1 | 5/2014 | Tavildar et al. | |
| 2017/0302392 A1 | 10/2017 | Farra et al. | |
| 2019/0110268 A1 * | 4/2019 | Abedini ................. | H04L 45/04 |
| 2021/0367693 A1 * | 11/2021 | S ........................... | H04J 3/0697 |

OTHER PUBLICATIONS

International Search Report for International application No. PCT/EP2022/053589 dated Jun. 3, 2022.

* cited by examiner 40             100             50

GPS7: 15:00:40
REM1: 15:01:10
REM2: 15:02:05
REM3: 15:01:15
REM4: 15:01:05
REM5: 15:03:10
REM6: 15:01:07

ROBUST TIME DISTRIBUTION AND SYNCHRONIZATION IN COMPUTER AND RADIO ACCESS NETWORKS

CROSS-REFERENCE TO RELATED APPLICATIONS

This application is a national phase under 35 U.S.C. § 371 of PCT International Application No. PCT/EP2022/053589 which has an International filing date of Feb. 15, 2022, which claims priority to Swedish Application No. 2150183-8, filed Feb. 22, 2021, the entire contents of each of which are hereby incorporated by reference.

TECHNICAL FIELD

The present invention relates to the field of signal transmission. More particularly, the proposed technique relates to methods and nodes for distribution of exact time within a network, for providing robust and exact synchronization in a network. The present disclosure provides methods for enabling robust GPS-aided synchronization between nodes in a network, such as for 5G networks. The present invention relates to systems, methods and nodes for enabling synchronization between a plurality of nodes in a network, by comparing the times of the GPS clocks of the plurality of nodes to determine accurate clocks being within a tolerance of each other, adjusting priority, and, if the priority of a local clock of a node is low, selecting a remote GPS clock to be used as a timing reference of the GPS clock of the node.

BACKGROUND OF THE INVENTION

Network synchronization, i.e. synchronization between nodes in a network, is essential for the function of a network. For example, packet based networks require frequency and time synchronization (phase alignment) between nodes for successful packet transfer, where operators may provide synchronization services to their customers.

The task of network synchronization in a network based approach comprises to distribute a reference signal from a primary reference clock (PRC) to all network elements requiring synchronization. The method used for propagating the reference signal in the network is usually the master-slave method, a hierarchical model where the slave clock must be slaved to clock of higher (or equal) stability. Synchronization information is transmitted through the network via synchronization network connections. Synchronization network connections typically are unidirectional and generally point-to-multipoint. A centralized timing network architecture may be used, or a distributed timing network architecture (e.g. GPS).

Synchronization measurements may include phase measurements in view of reference signals, phase deviation and analysis of the phase time interval error, fractional frequency offset, maximum time interval error (MTIE) and time deviation (TDEV).

Time transfer (relative and absolute) describes mechanisms for comparing measurements of time and frequency from one location to another. Time transfer is a scheme where multiple sites share a precise reference time. Multiple techniques have been developed, often transferring reference clock synchronization from one point to another, often over long distances. Time transfer may be used for time synchronization between different entities or nodes in a network, which is essential for the function of the network.

Techniques for time synchronization of network nodes without utilization of GPS includes, for example, the network time protocol (NTP), which may be used to synchronize the clocks of network nodes to a master node or a reference clock using time stamps. The Precision Time Protocol (PTP) is a protocol used to synchronize clocks throughout a computer network, also known as IEEE 1588. There are five basic types of PTP devices ("clocks"); ordinary clock (master or slave), boundary clock ("master and slave"), end-to-end transparent clock, peer-to-peer transparent clock and management node. All five types implement one or more aspects of the PTP protocol. The transparent clock modifies PTP messages as they pass through the device. Timestamps in the messages are corrected for time spent traversing the network equipment. This scheme improves distribution accuracy by compensating for delivery variability across the network.

As an alternative to the network based approach, synchronization may also be achieved using global positioning systems (GPS), e.g. by installing GPS receivers at transmitter sites. GPS receivers, however, may be easily intentionally or unintentionally jammed, or fail for other reasons such as equipment failure.

For tele communication, such as in a wireless telecommunication network, the network nodes need to be synchronized with each other, where after the terminals synchronize to the respective network nodes. In the implementation of the radio access technology New Radio (NR) for realizing 5G communication, a terminal will be connected to several base stations or network nodes for enabling communication. Hence, the need for network synchronization between the different base stations has increased.

The requirements of 5G in view of speed and latency requires exact timing, where PTP and NTP may not be sufficient. GPS will deliver the required accuracy, but may be unreliable due to its vulnerability to interference or jamming. Thus, enhanced methods for network synchronization in 5G networks are needed.

SUMMARY OF THE INVENTION

An object of the present disclosure is to provide methods, nodes and systems, which seek to mitigate, alleviate, or eliminate the above-identified deficiencies in the art and disadvantages singly or in any combination. This object is obtained by a method in a first node for enabling synchronization between nodes in a network comprising receiving, from each of a plurality of remote nodes, an indication of a remote time of a GPS clock of the remote node, comparing the received remote times and a local time of a local GPS clock in the first node to identify one or more subgroup of times that are within a tolerance range of each other, determining that a subgroup of GPS clocks corresponding to an identified subgroup of times belong to a group of accurate clocks, and, if the GPS clock of the first node is not within the group of accurate clocks, and lowering the priority of the local GPS clock to low priority to select a remote GPS clock as timing reference.

The remote GPS clock is selected from the determined group of accurate clocks, and used as a timing reference of the local GPS clock of the first node by synchronising the local GPS clock of the first node to the selected GPS clock. Thus, the local clock slaves on the remote GPS instead of the local GPS. After synchronisation the priority of the local GPS clock may be increased when it is determined to belong to the group of accurate clocks again. If the comparison determines that the GPS clock of the first node is within the group of accurate clocks, the priority of the local clock is set to high and the time provided by the local GPS receiver of the local GPS clock of the first node is used or maintained as timing reference for the local GPS clock to be synchronized.

In other embodiments, if the method is carried out in a first node being a central node for enabling synchronization between the plurality of nodes, the method comprises comparing, in the central node, the received remote times to identify one or more subgroup of times that are within a tolerance range of each other, determining that a subgroup of GPS clocks corresponding to an identified subgroup of times belong to a group of accurate clocks, sending a message to each node, of the plurality of nodes, which corresponding clock is not part of the subgroup of accurate clocks, indicating that the node should set the priority of its local GPS clock to low, and sending a message to each node, of the plurality of nodes, which corresponding clock is part of the subgroup of accurate clocks, indicating that the node should set the priority of its local GPS clock to high. The remote nodes which have received an indication to lower their priority may then perform the method of selecting a remote clock to use as timing reference based on the priorities and distance of the remote clocks.

According to some aspects is provided a first node, comprising processing circuitry configured for enabling robust GPS synchronization between nodes in a network, the node comprising a communication interface, an internal clock, a GPS receiver, and processing circuitry including a memory and processor configured to cause the node to carry out the method described above.

In other embodiments is provided system comprising a network and a plurality of nodes, the system being configured to cause the all the nodes to individually carry out the method as described above for the first node.

In a further aspect aspects, a method performed in a system comprising a network of nodes is provided, the method enabling synchronization between a plurality of nodes in the network of said system, each of the plurality of nodes being connected to a local GPS clock, the method comprising performing, by the plurality of nodes in an area of the network, the method of described above for the first node, for identifying inaccurate local GPS clocks and enabling clock recovery of said inaccurate clocks to obtain synchronization.

In some aspects, the first node is selected from the group of a 5G base station, gNode B, 5G small cell, eNode B, Node B, digital TV-transmitter, power station in smart grid, a data communication equipment, and a data terminal equipment. In other aspects are provided a computer program comprising computer program code which, when executed in a network node, causes the network node to execute the methods described above. In yet another aspect, a carrier containing the computer program is provided, wherein the carrier is one of an electronic signal, optical signal, radio signal, or computer readable storage medium.

Further objective of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

Figure 1:
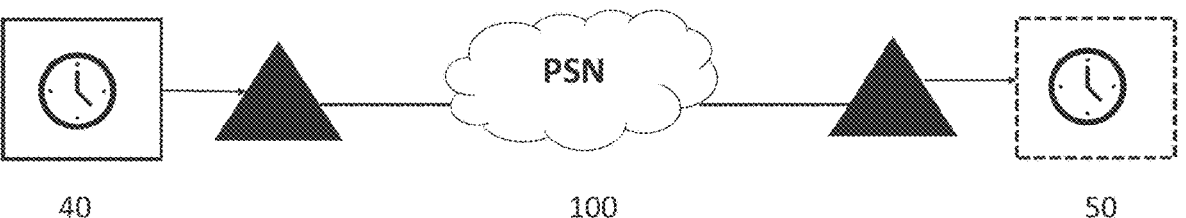
FIG. 1 illustrates time transfer over a packet switched network (100).

All the figures are schematic, not necessarily to scale, and generally only show parts which are necessary in order to elucidate the invention, wherein other parts may be omitted or merely suggested.

DETAILED DESCRIPTION

The fifth generation of mobile technologies—5G—is expected to connect people, things, data, applications, transport systems and cities in smart networked communication environments. It should transport a huge amount of data much faster, reliably connect an extremely large number of devices and process very high volumes of data with minimal delay. 5G technologies are to support applications such as smart homes and buildings, smart cities, 3D video, work and play in the cloud, remote medical services, virtual and augmented reality, and massive machine-to-machine communications for industry automation. These new functionalities and new services necessitate a new way of deploying advanced mobile services, as well as new approaches in making 5G technologies work together in industrial settings by machine-to-machine communications, Internet of Things (IoT) or with connected vehicles.

When deployed, 5G networks should deliver more speed and capacity to support massive machine-to-machine communications and to provide low-latency (delay), high-reliability service for time-critical applications. Coverage of a given area will require a significantly increased number of base stations that will increase the complexity of the infrastructure, including the need to deploy radio equipment on street facilities, such as traffic lights, lampposts, utility poles and power supplies.

Due to the speed and capacity requirements of 5G, as well as for resource and spectrum management and seamless handoffs, accurate timing has become more important. Also, in 5G radio access networks (RAN), a device or station will be simultaneously served by more than one base station, whereas synchronized time between different neighboring base stations (eNB, gNB, small cell etc) will be increasingly important. Hence, enhanced methods for synchronization and time transfer in 5G networks have been developed, as presented in the current disclosure.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some embodiments a non-limiting term "node" or "network node" is used. It should be understood that this term refers to any type of node that may send and/or receive information, such as data and control information, over a network. The node may sometimes also be referred to as a "station" or "base station" when applicable. The node may also be referred to as a "site", or present at a site. A physical node is typically an electronic device that is attached to a network, and is capable of creating, receiving, or transmitting information over a communications channel. The node may be a node in a 5G wireless communication network, such as a 5G network node, a 5G macro cell (e.g. gNB) or 5G small cell. The network node may also be a 4G sector base station (e.g. eNB) for use in 5G communications. The node may be a node in machine to machine (M2M) communication, e.g. a machine type communication (MTC) node for realizing massive MTC and Internet of things (IoT) applications, or a node in a e.g. a vehicle-to-everything (V2X) application for enabling Ultra-reliable low latency communications (URLLC). The node may also be a node for use in enhanced 5G mobile broadband (eMBEI) applications, providing significantly faster data speeds and greater capacity than previous mobile broadband applications. New applications will include fixed wireless internet access for homes, outdoor broadcast applications without the need for broadcast vans, and greater connectivity for people on the move. A node of the invention may also be a TV transmitter, encompass a data communication equipment (DCE) such as a modem, hub, bridge or switch; or data terminal equipment (DTE) such as a digital telephone handset, a printer or a host computer. In another example the node may be a computer terminal connected to a network, such as a local area network (LAN), wide area network (WAN) or the Internet.

The term "device", "terminal", "mobile station" or "user equipment, UE" as used herein refers generally to a device which is served by another node, such as a base station. The device does not necessarily need to be mobile, unless referred to as a mobile station. The device may also relate to a node as described above, being served by another node.

The term "network" refers to any type of network over which a network node may communicate, such as a radio communication network (RAN), a local area network (LAN), wide area network (WAN) or the Internet. The RAN may be a wireless communication network for enabling 5G, e.g. by implementing NR. The network may be referred to as an Internet Protocol (IP) network, a communication network that uses IP to send and receive messages between one or more computers, which may be implemented in Internet networks, LAN and enterprise networks, for example. The network can serve 5G or a digital television (DTV) distribution network operating in single frequency network (SFN) operation.

By "timing recovery" or "clock recovery" is meant to recover a clock at the symbol rate or a multiple of the symbol rate from the modulated waveform. This clock is required to convert the continuous-time received signal into a discrete-time sequence of data symbols. In serial communication of digital data, clock recovery is the process of extracting timing information from a serial data stream to allow the receiving circuit to decode the transmitted symbols. Clock recovery from the data stream is expedited by modifying the transmitted data. Wherever a serial communication channel does not transmit the clock signal along with the data stream, the clock must be regenerated at the receiver, using the timing information from the data stream. Clock recovery is a common component of systems communicating over wires, optical fibers, or by radio.

The term "GPS clock" refers to a local clock in a node, station or device, which clock is controlled by the time information received by a local GPS receiver from the satellites of the GPS system. Sometimes the general term "clock" is used for describing a GPS clock. With a "local clock" in view of a certain node or station is meant a clock that is present in/at said node or station. With a "remote clock" in view of a certain node is meant a clock that is not present in/at said node, but present at another node/station remotely located from the said node/station. With a "high quality clock" is meant a clock that have low intrinsic timing errors, and which is able to keep the time without starting to drift when GPS connection is lost, such as atomic clocks. A lower quality clock is typically the cheaper crystal clocks, which will start to drift when e.g. a GPS connection or other time reference connection is lost. For GNSS a rubidium atomic clock is typically used as a high quality clock. The clocks may show wrong time or correct time. A clock showing a wrong time may also be referred to as inaccurate or incorrect, such as an inaccurate or incorrect clock. A clock showing the correct time may also be referred to as accurate or correct, such as an accurate or correct clock.

By "tolerance", "tolerance range" or "tolerance level" as used herein is meant a greatest deviation in time between two clocks which are acceptable for ruling that the clocks show "the same" time, and is used for placing a clock within a subgroup of the group of compared clocks, the subgroup consisting of clocks showing the same time (the deviation between a clock and all other members should be within the tolerance range). One example of identifying which clocks that are to be selected as showing the same time when having a tolerance of e.g. 100 ns is to first identify a group of clocks which have an even lower tolerance (say 20 ns). These may be identified/selected, and their average time may be calculated. Based on said average time, a tolerance of +−50 ns will be set for identifying the rest of the clocks showing the same time within the tolerance. The tolerance is typically set/configured by the application, where a certain application is linked to a certain tolerance. The tolerance may be known to, such as stored in the memory of, the station. The tolerance may also be pre-determined, or may be learnt by the station using artificial intelligence such as machine learning. Accordingly, times that are within tolerance range of each other" thus refers to times that do not deviate from each other so as to exceed the tolerance range, i.e. that the greatest deviation possible between two times in the tolerance range is the tolerance range value.

The clocks having a time within the tolerance in comparison to each other are placed within a subgroup of the compared clocks considered as showing the same time, and the subgroup is considered as clocks showing the accurate time. If several subgroups of clocks are formed, each subgroup comprising clocks being within a tolerance of each other but not within tolerance of the other subgroup, the largest subgroup (comprising the greatest number of clocks), is determined as showing the correct time. Alternatively, the sub group comprising the highest quality clock is selected as the group of accurate clocks. All clocks slave on a GPS, but the hold over is better in a higher quality clock. Thus, if one group comprises an atomic clock, it may be selected. A group comprising a cesium atomic clock may be selected over a rubidium atomic clock comprising group. The skilled person is aware of which type of clocks that are more accurate than others, and would know how to select based on quality. When a group is selected based on comprising the highest quality clock, the tolerance may be set around said clock, e.g., having a tolerance of 100 ns would mean +−50 ns from said high quality clock. The selection between the largest group and the group with the highest quality clock may depend on the differences distance between the clock to be synchronized and the respective group, and also on the difference in quality of the clocks in the respective groups.

The GPS clocks of the present disclosure may be linked to a "priority", which refers to a temporary property of the clock. A GPS clock will initially have a high priority when being synchronized to its local GPS receiver. When performing the method, the local first node will identify its own clock to be within or outside of the tolerance. If being within, the priority of the clock is increased or maintained if already high. If found to be outside, the priority will be decreased, and a remote clock will be used as synchronisation source. In the next comparison, if the time of the local GPS receiver is found to be within the tolerance, the priority is increased again, and the local clock switches back to use the local GPS receiver as synchronization source. The priority may thus be "high" and "low", but may also be "medium", when the time of the local GPS receiver is found to be inaccurate, but none of the other remote clocks are considered to be better, e.g. based on distance or quality. The quality of a clock may also affect the priority. When selecting sync source priority and distance are weighted together. This means that a higher quality clock can be selected by a node even if it is located at larger distance. In a first step in one embodiment, the priority may be determined as high or low, where high indicates "use" or "may be used" and low indicates "do not use". Typically, a clock which determines that it has a high priority will keep its time, while a clock determining that it has a low priority (not within tolerance) will look for a clock to synchronize with amongst clocks with a high priority (determined to be within the tolerance range). In the next step, the quality of the other clock and the number of hops will affect which other clock that is chosen.

When selecting which clock within the accurate group to use for time distribution/synchronization/clock or timing recovery, usually the closest or most accurate clock is selected. By "closest" is meant a clock within the least number of hops from the clock being recovered. By "most accurate" is meant a clock being the highest quality clock, such as a rubidium clock compared to less accurate crystal clocks, or if all clocks are of the same quality, the one closest to the mean time within the accurate group. Typically, the closest clock in the accurate group is first selected, and if several clocks have the same distance, the most accurate clock is selected. Alternatively, if the closest clock is a low quality clock and a high quality clock is available further away, the selection will be based on a compromise, comparing the distance and the qualities of the clocks to decide which one is preferred to use as timing reference based on knowledge of clock qualities and algorithms for calculating time distribution errors. The skilled person would know of how to compare number of hops and clock qualities to determine the preferred clock to use. If several clocks have the same distance and the same accuracy (several most accurate clocks), the clock to use for timing recovery is randomly selected between these clocks.

The terms "IEEE 1588" and "Precision time protocol (PTP)" may be used interchangeably herein, and refers to a protocol used to synchronize clocks throughout a network.

Network delay is a design and performance characteristic of a telecommunications network. It specifies the latency for a bit of data to travel across the network from one communication endpoint to another. It is typically measured in multiples or fractions of a second. Delay may differ slightly, depending on the location of the specific pair of communicating endpoints.

In computer networking, packet delay variation (PDV) is the difference in end-to-end one-way delay between selected packets in a flow with any lost packets being ignored. The effect is sometimes referred to as packet jitter. PDV hence relates to the variation between the individual delays of different (selected) packets in e.g. a transmitted stream of packets, such as a block. Increased traffic increases the jitter.

In telecommunications, the Round Trip Delay (RTD) or Round Trip Time (RTT) is the length of time it takes for a signal to be sent plus the length of time it takes for an acknowledgement of that signal to be received. This time delay includes the propagation times for the paths between the two communication endpoints. In the context of computer networks, the signal is generally a data packet, and the RTT is also known as the ping time. An internet user can determine the RTT by using the ping command. End-to-end delay is the length of time it takes for a signal to travel in one direction and is often approximated by half the RTT.

Time (relative and absolute) and frequency transfer describes mechanisms for comparing measurements of time and frequency from one location to another. Frequency transfer may be performed using either physical layer options (SONET/SDH, SDSL, GPON, Synchronous Ethernet) or packet-based options (SAToP, CESoPSN, NTP, PTP). Using the packet-based option have several benefits, such as flexibility, simple in theory and applicable to both frequency and time, while the drawbacks are the complexity of the network and the network traffic, which make real life implementation not as easy as the ideal theoretical case.

FIG. 1 illustrates time transfer over a packet switched network, PSN (100). A signal from a reference clock 40 is used for generation from signal to packet, transferred as a packet transmission over a packet network, 100, and recovered from packet to signal for recovery of the recovered clock, 50.

Time transfer is a scheme where multiple sites share a precise reference time. In a one-way time transfer system, one end transmits its current time over some communication channel to one or more receivers. The advantage of one-way systems is that they can be technically simple and serve many receivers, as the transmitter is unaware of the receivers. The principal drawback of the one-way time transfer system is that propagation delays of the communication channel remain uncompensated except in some advanced systems.

In a two-way time transfer system, the two peers will both transmit, and will also receive each other's messages, thus performing two one-way time transfers to determine the difference between the remote clock and the local clock. The sum of these time differences is the Round Trip Delay between the two nodes. It is often assumed that this delay is evenly distributed between the directions between the peers. Under this assumption, half the Round Trip Delay is the propagation delay to be compensated. A drawback is that the two-way propagation delay must be measured and used to calculate a delay correction. To calculate delays and determine compensation, information such as time stamps, time difference measurements, correction factors, and various statistics between nodes involved in two-way time transfer needs to be available.

Time-based communications is a technology where an active data communications channel is used as a vehicle for two-way time transfer. Precision timing is provided in the background of an active data transfer channel (one that is being used for data communication). This allows two ends of a communications link to be precisely synchronized without fielding an independent timing system.

The two-way time transfer mechanism is the basis of all packet time transfer protocols, such as Network Time Protocol (NTP) and IEEE 1588, Precision Time Protocol (PTP). They generally assume path symmetry and path consistency, although IEEE 1588 has the concept of asymmetry correction. However, the correction values are not dynamically measured—they need to be statically configured.

The NTP standard employs servers that supply clients, such as the computers in a network, with current Coordinated Universal Time, or UTC, information in response to individual requests. Although a hardware can ask for the present time from many different servers in the network, some devices provide more accurate data than others due to factors like system lag and latency.

The timekeeping servers in these networks are arranged in distinct strata, also known as layers. The most accurate devices exist in Stratum 0, and they include atomic, radio and other high-precision clocks, such as those found in NIST laboratories and GPS satellites. Stratum 1 servers, also known as primary time servers, are connected directly to Stratum 0 devices as well as their same-level peers.

PTP, defined in IEEE 1588, facilitates applications where the NTP lacks sufficient accuracy. By utilizing hardware-based timestamping, it provides more accurate synchronization. IEEE 1588/PTP, is a protocol that distributes frequency, phase and time over packet based network, and has become the standard for distribution of high accuracy time. Following guidelines for specific network architectures allows the delivery of time to accuracies of one microsecond. This level of accuracy is required for mobile base stations using either Time Division Duplex technology and/or advanced LTE functions, as well as in the power industry for intelligent electronic device alignment. More lenient architectures can still achieve 100 microseconds or better accuracies which can greatly enhance the usefulness of event logging and network one way delay measurements. In addition, 1588 has been used to deliver a frequency reference for T1/E1 ports or for mobile base station frequency alignment. This is useful in environments where the transport network does not provide physical layer synchronization services.

Figure 2:
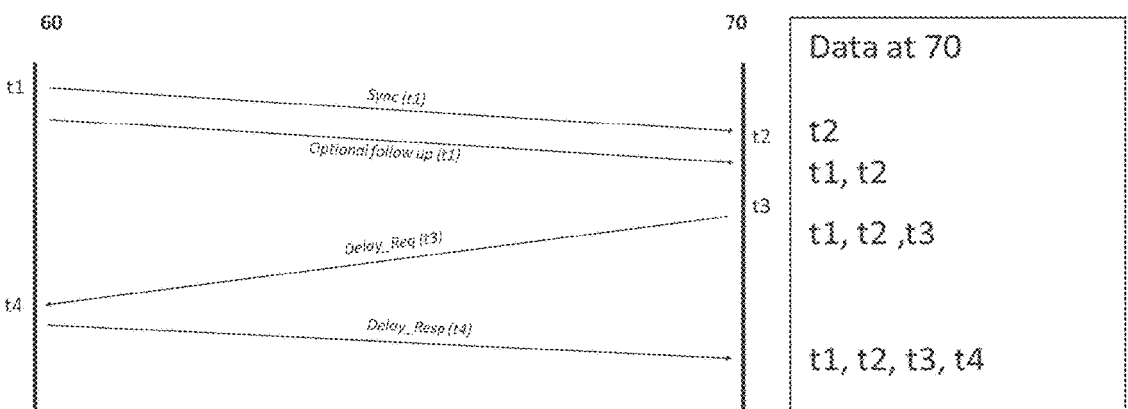
FIG. 2 is an illustration of a clock synchronization using PTP messages including an exchange of four timestamps between a reference clock and the clock to be synchronized.

PTP uses an exchange of four timestamps between a reference clock (master port) and the clock to be synchronized (slave port), as illustrated in FIG. 2. The master (60) sends a PTP Sync message (Sync (t1)) containing a timestamp of when the Sync message is transmitted (t1) to the slave (70). In a two-step master clock, the t1 timestamp is sent in a Follow_Up message (Optional follow up (t1)). The slave records the time it receives the Sync message (t2). At some point after receiving the Sync message, the slave sends a Delay_Req message back to the master (Delay_req (t3)).

The slave records the time of transmission of the Delay_Req message (t3) locally. The master records the time it receives the Delay_Req message (t4) and sends this timestamp back to the slave in a Delay_Resp message (Delay_Resp (t4)).

If the delays in the two directions are actually different, then it will introduce an error in the offset from the master. The IEEE 1588 standard includes procedures to compensate for this asymmetry, if it is known, but if it is uncompensated it does introduce time error.

PTP is used to synchronize clocks in a network for local systems requiring higher precision than NTS, but that cannot afford GPS receivers in every node. PTP accuracy is very much dependent on number of hops from clock source (stratum "no of hops" clock). It has difficulties with having good accuracy in larger installations due to competing traffic and uncertain delay variations.

The Global Positioning System, GPS, uses atomic clocks for synchronization. Atomic Clocks are clocks locked to atomic standards, which are much more stable timekeepers that the general master clocks used in e.g. PTP, and which have a direct link between the time source and the clock using GPS. For example, Rubidium, Cesium and Hydrogen Maser clocks are very accurate. However, atomic clocks themselves do not guarantee traceability and synchronization with other clocks. That is where GPS comes in. The GPS system consists of fixed constellations of special orbiting satellites that each carry stabilized Stratum 0 atomic clock hardware, advanced location tracking circuitry, and transmitters that constantly broadcast their position and clock time.

A GNSS, or Global Navigation Satellite System, is a generic name for a group of artificial satellites that send position and timing data from their high orbits. The GPS is just one of the many different sets of satellites that can provide such data. GPS (or GNSS) satellites include three or four atomic clocks that are monitored and controlled to be highly synchronized and traceable to national and international standards (known as UTC). So, for time synchronization, the GPS signal is received, processed by a local master clock, time server, or primary reference, and passed on (distributed) to "slaves" and other devices, systems, or networks so their "local clocks" are likewise synchronized to UTC. Typical accuracies range from better than 1 microsecond to a few milliseconds depending on the synchronization protocol. It is the process of synchronization to GPS that can provide atomic clock accuracy without the need for a local atomic clock. Still, local atomic clocks are sometimes desired as a long-term back-up solution to loss-of-GPS, either in the case or a weather-related outage, GPS interference, or other scenarios.

Figure 3A:
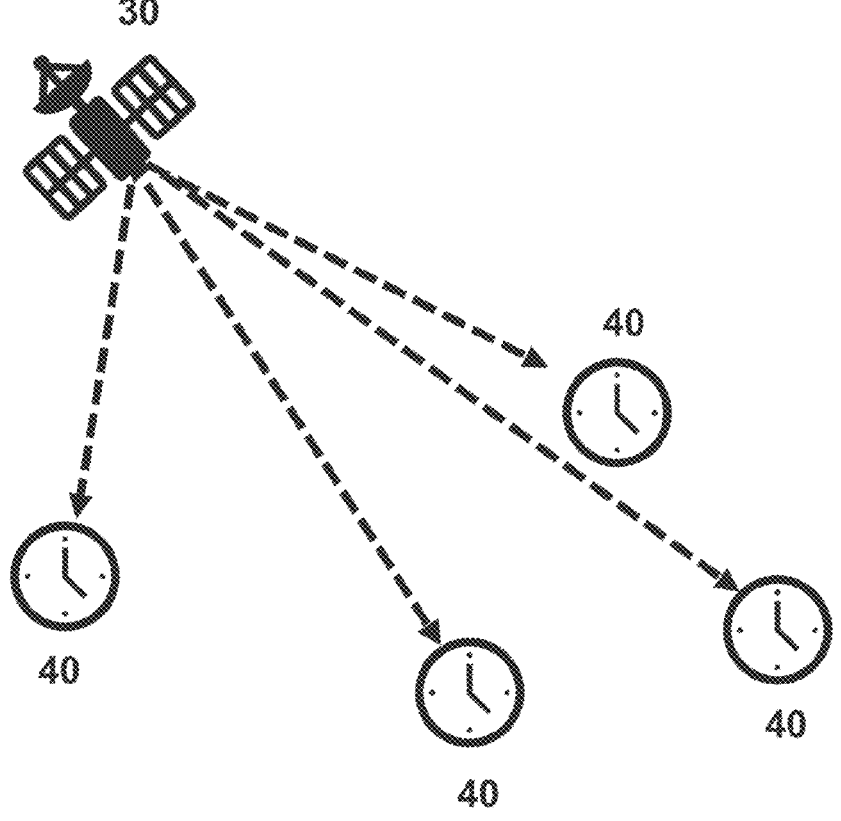
FIG. 3A illustrates GPS-based synchronization of clocks (40) directly via GPS.
Figure 3B:
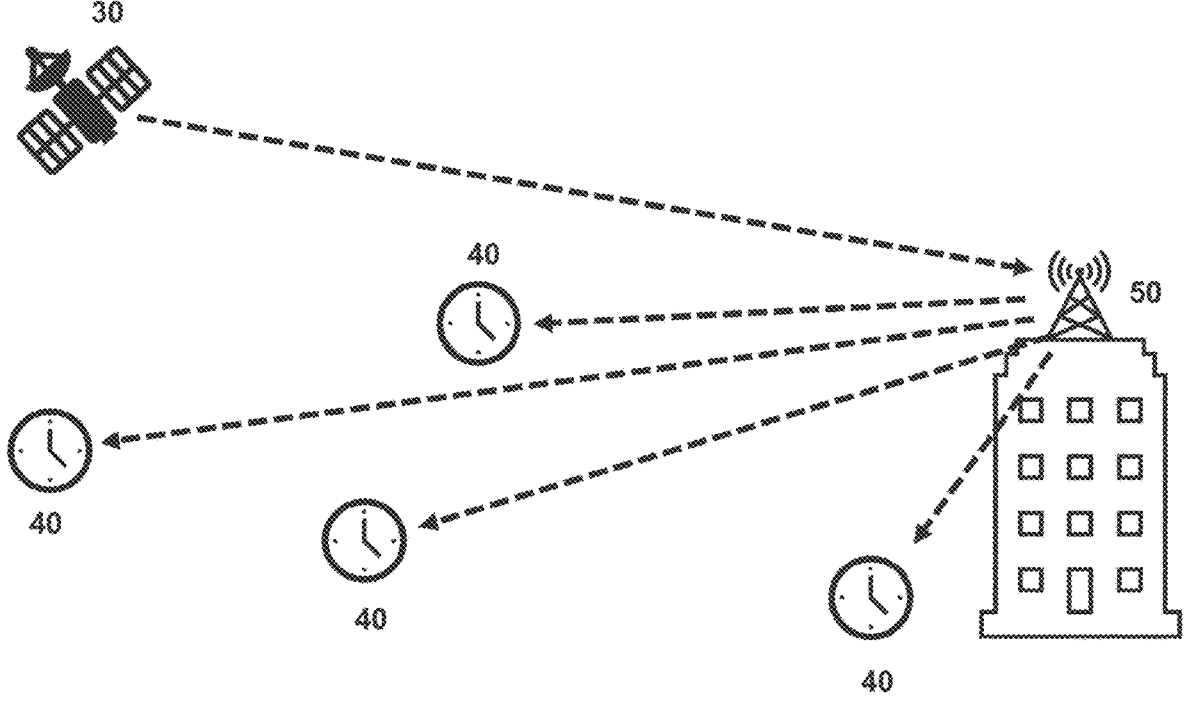
FIG. 3B illustrates the synchronization of a base station (50) via a GPS satellite (30), and subsequent time distribution to distributed clocks (40).

The GPS satellites have atomic clocks that keep very precise time, but it's not feasible to equip a GPS receiver with an atomic clock. A GPS chipset is the main integrated circuit (IC), which receives the GPS signals, and decode it. It needs external peripherals to work such as external power supply, clock, antenna, low noise amplifier (for better sensitivity) etc. On the other hand, GPS module comes in a complete package that requires no other external circuitry for GPS reception. It may or may not contain antenna on it. For base stations using GPS, an external antenna is mounted outside the base transceiver station (BTS) box facing sky. The antenna is connected to the GPS module mounted inside the BTS box. The GPS module is connected to the BTS's processing unit (e.g. FPGA, CPLD or other base band processor) using an interface (e.g. universal asynchronous receiver-transmitter interface). An example of GPS-synchronization is shown in FIGS. 3A and B. FIG. 3A illustrates a GPS-based synchronization of clocks (40) directly via a GPS satellite (30), in which the clocks (40) comprise their own GPC receivers. FIG. 3B illustrates the synchronization of a base station, the base station (50) receiving a GPS signal from a GPS satellite (30) and distributing the GPS-acquired time to distributed clocks (40). The base station comprises a GPS receiver and a GPS synchronized clock, which is used as a master to distribute its time to the slave clocks (40).

GPS clock synchronization eliminates the need for manual clock setting (an error-prone process) to establish traceability to national and international standards so various events can be correlated even when they are time-stamped by different clocks. The benefits are numerous and include legally validated time stamps, regulatory compliance, secure networking, and operational efficiency.

Many applications require synchronization for their operation. It is typically used in for example 5G mobile networks where a device is able to communicate with multiple base stations at the same time. The requirements in terms of reliability and accuracy depends much on the application. For example, Single Frequency TV distribution requires 1 microsecond accuracy while 5G mobile can require down to 100 ns depending on the application.

There is basically two ways of attaining time and synchronization on remote sites such as a 5G base station site. The first is using a GPS receiver which receives time from the GPS satellites. GPS synchronization provides great accuracy due to the precise timing and direct connectivity to the clock source. However, the system is sensitive due to the weak signals, which can be tampered with intentionally (people scrambling or jamming the GPS signals) or unintentional (thunder, atmospheric issues, etc.). The GPS connection may be lost or disrupted, hence the system is accurate when operational, but lacks robustness.

The second way of attaining time and synchronization at a 5G base station site is to use network based time distribution, e.g. using two-way time transfer (such as IEEE 1588/PTP) to distribute time and synchronization from one site to another. Network based distribution is normally done from one or several central sites to a large number of destination sites. Compared to GPS, the communication being done node-to-node either over the air or wire makes the communication more secure and robust. Also, with a network of several paths, redundancy can be implemented. However, as the number of hops to the clock source increases, accuracy becomes lower by the number of hops passed due to jitter because of other traffic. Asymmetrical delays also affect the accuracy. For many applications, the accuracy is not simply good enough. For example, Coordinated Multi-Point (CoPM) 5G requires 100 ns accuracy which is difficult to reach over several hops.

Thus, both systems have their benefits and drawbacks. Each of the two main ways of distributing time and frequency has its benefit, accuracy of GPS and robustness of network-based time distribution. Most equipment like 5G nodes and TV transmitters have built in GPS receivers making the use of GPS inexpensive. Both systems normally have hold over clocks to cope with shorter times of outages. The more stable hold over clock the more time the node can manage outage. In network-based synchronization distribution installations, there are one or several clock sources which have a stable internal clock and are slaved to the GPS system making these clocks in absolute sync.

In view of the above identified problem, the object of the present invention is to provide a robust and accurate synchronization method, which allows for the accuracy of the GPS, and the robustness of network based time distribution, such as PTP. By implementing a method where several 5G sites, all or most having a GPS synchronized clock (clocks connected to local GPS receiver), compare their clocks to determine an accurate time, the drawbacks of the prior art may be mitigated.

In network-based time distribution systems, there are several GPS synched clocks available and the selection of which clock to use as source is normally based on priority, and in case of equipment or network failure another source is selected. GPS synchronization is very accurate when operable, however, the GPS timing may be distorted, jammed, or manipulated, in which case using GPS timing will provide an erroneous time. Thus, GPS synchronization lacks robustness.

The underlying concept of the invention of the present disclosure is to add robustness to GPS based sync distribution, and leverage on that in some type of equipment, like 5G base stations, all or most stations have a GPS clock, i.e. a clock connected to a local GPC receiver/antenna. This is achieved by using remote GPS timing from other stations (e.g. base stations) if the local GPS timing fails or is not reliable anymore. The methods of the present disclosure first identify a problem with the local GPS used for synchronization, and handles this by disabling the local GPS and use another GPS. Handling of equipment or network errors is performed in the same way as for normal network based network distribution. However, this requires determining which current GPS timings that are correct or erroneous, such as determining that the current local GPS timing is erroneous, as well as knowing which remote GPS timing that is accurate and should be selected for timing recovery.

Hence, the tricky part is to identify if a GPS clock is for example manipulated or jammed, and shows an erroneous time. To be able to determine if a GPS clock shows the wrong time, and to determine which of the neighboring GPS clocks in the area that shows a correct time, the present disclosure proposes a solution where the main idea is for a GPS clock/device comprising a GPS clock to monitor the GPS clocks in an area, and compare them to their own GPS clock. Monitoring of the other GPS clocks is typically done by using a time transfer protocol, such as IEEE 1588, with a session to each of the GPS clocks being monitored and compare the clock to each other and to the local clock. The time transfer protocol, e.g. the IEEE 1588 sessions, can be run over the wired network or over the 5G or other wireless network between the stations.

As an example, a network node receives, through time transfer, a time at a remote GPS clock from a number of remote GPS clocks. At the receiving node, the remote clocks and the local GPS clock is compared. If the system is in normal operation, all remote clocks and the local clock shall be within a tolerance, such as for example 100 ns, if that is the time tolerance of the systems operation. In that case, all stations shall have set their local GPS clock at highest priority meaning that all stations use their local clock, hence the receiving node will continue to use its local GPS clock. However, if there are some clocks, local or remote, that falls out of the tolerance, these will be detected by the respective station. Thus, in this case the local station will compare its clock to the other clocks, determine if it is accurate or not, and act upon said determination accordingly. If the local clock is detected as falling outside of the tolerance, the station shall then lower the priority of its GPS clock to select a remote clock, using for example IEEE PTP. Thus, if the receiving node determines that its local clock fall outside of the tolerance range, it will lower its priority and determine to use a remote clock as a temporary master for its local clock, i.e. it will slave on the remote clock until the local clock is determined as accurate again, i.e. until a new assessment of the local clock determines that it is within the tolerance range, in which case the priority is increased to high again. Which remote clock that the local clock of the receiving node will adjust to depends on the comparison between the remote clocks of the remote nodes, identifying a group of accurate clocks, and selecting amongst them the closest or highest quality clock, or a combination of those. Typically, the accurate clocks should be within the tolerance range of all other clocks in the determined group of accurate clocks. Alternatively, a more reliable station may decide which clocks that should belong to the group of clocks within the tolerance. The tolerance range or level is typically set by the application needs, such as 100 ns for CoMP and 1 µs for DVT.

Thus, a receiving node may detect that its local GPS clock falls outside of a tolerance range in comparison to other GPS clocks, and thereby determine to use a remote clock as timing reference by lowering the priority of the local clock. Which remote clock to use as a timing reference may be determined by the priority of the other clocks. By first removing all of the remote clocks falling outside of the tolerance range by identifying them in the comparison, or by using priority (if they have performed the method and determined to be outside of the tolerance, they will have reduced their priority to low), and then comparing the remaining remote clocks to establish which ones have a high priority, which one that is closest to the local clock, and/or which one is a high quality clock. The selection of which remote clock to use may be local, or the local station may be instructed to lower (or increase) the priority and the IEEE 1588 will perform the selection.

The determination, such as identification and selection of which GPS clocks within a population that are considered as sufficiently correct, is done by identifying a sufficiently large number of GPS stations (nodes/stations with a clock with an associated GPS receiver) that is within the clock tolerance, i.e. have their clock time within the pre-defined tolerance range. All clocks with GPS receivers outside this identified group shall have their priority lowered to not be selected. If the total group to be compared is for example 50 sites (50 nodes/stations with GPS clocks located at different sites), and there is a severe disturbance, it might only be a group of 10 sites (nodes/stations) which have clocks within the tolerance. These 10 will then maintain high priority and will be used to sync the other stations. It does not need to be a majority of the clocks of the total group which is "correct" (within tolerance range), only a sufficiently large group of clocks (such as 10 out of 50) within the given tolerance is enough for carrying out the method of the present disclosure. The minimum group are configurable in the solution. The assumption is that clocks that are wrong in the different stations are not collectively wrong, but are spread outside the tolerance of the group of correct clocks. Thus, it would be possible to identify one, or possible two or three groups, that comprise clocks within the tolerance range of each other. The largest group is typically selected as the accurate group, alternatively, instead of selecting the largest group, the group having the lowest tolerance within the group or comprising the highest quality clock (one such clock is enough) may be selected. If the number of clocks in the largest accurate group would be very low, the GPS's in the system would probably be malfunctioning in some way, in which case one could use hold over or synchronize to the nearest high quality clock. One may then also use a medium priority in this case, which means that the clock is "low priority" when it regards to other clocks slaving on it, but may still be used when determining group affiliation.

The system also relies on that the sites in the group are not too many hops away, hence typically chosen from an area in proximity to the node carrying out the method, so that the inaccuracy of network-based time distribution, which increases with distance, does not affect the performance or the accuracy of the system, and hence the possibility to determine which clocks are wrong. For example, in practice there may not be more than e.g. 2-5, such as 2-3, switch hops between the sites in the group, or between the site performing the method and the other sites being compared.

In normal operation, all nodes or stations will use their built in GPS clock. In case of finding their local GPS clock outside of the "correct group", i.e. outside of the tolerance range, the node/station with an inaccurate clock will use e.g. PTP to receive a clock from the closest node/station with an accurate GPS clock.

The stations will compare their GPS clocks to a group of other stations's clocks regularly to see if they are still accurate, i.e. each station (node) will compare its local clock to a group of remote clocks to determine if it still falls within the set tolerance range. If not, the node/station will lower the priority of their own clock.

In one embodiment, the comparison can also be done in one central node, the central node obtaining respective times from the other nodes/stations and deciding which are within the group of "correct time", i.e. within the tolerance range. Stations outside the groups will be instructed to lower their priority, which will lead to a selection of a new time from a clock with higher priority, preferably the one within the correct group being closest in relation to number of hops or delay, or the highest quality clock within said group.

Thus, the present invention relies on GPS as synchronization source, and use PTP with multiple synchronization sources to distribute the clocks between the sites and have many clocks with the same priority, compare the GPS time between a large set of GPS clocks, and within said set or group identify a subset or subgroup of clocks showing the same time within a tolerance range. The clocks falling outside of said subset is deemed inaccurate, i.e. showing wrong time. By lowering the priority of the inaccurate clocks, the clocks are excluded from the subset of high priority clocks. The method is performed continuously, where the clocks of the different sources (nodes/stations/sites) are continuously compared to adapt the priorities continuously.

Alternatively, or in addition, it is also possible to use Artificial Intelligence (AI) or machine learning (ML) to identify and learn that certain clocks have repetitive problems and might be removed from the group of correct clocks, or monitored more carefully, based on historic information. This can be useful to prevent behaviour from repetitive atmospheric problems or repetitive disturbances by electrical machines, etc. By monitoring changes in priorities, it may be able to identify and adapt to recurring patterns, and to identify recurring problems like for example jamming. Thus, it is possible to use AI to "pre-exclude" one or more GPS from the set of high priority GPS'es to be used. In a region, for example a city, multiple GPS'es will be used at the same time, reducing the hop to the clock source. Non accurate GPS'es will be excluded.

The system of the invention, and nodes and methods performed therein, are primarily intended to be used for robust clock distribution in 5G networks or similar, but could be applicable to any network having nodes with GPS clocks (local GPS receivers). 5G networks are generally dependent on exact time, both due to the requirements on timing an latency, and due to the use of multiple base stations in the RANs, where multiple base stations are connected at the same time to a terminal, device, user equipment (UE) or mobile station. A UE may be served by multiple base stations at the same time, potentially both 5G base stations and LTE base stations, such as gNBs, eNBs or NBs, and 5G small cells or nodes for Massive MTC (smart devices, buildings, meters) or critical MTC (traffic control, industry control or remote surgery). 5G have different modes of operation, with one of the most demanding ones, 5G CoPM, being a combination of CoMP and MIMO (multiple input multiple output), i.e. multiple access points using several antennas, requiring 100 ns accuracy for the clock/timing.

Thus, the concept of the present disclosure is to provide a robust GPS synchronization method by identifying GPS clocks which are currently inaccurate due to some disturbance (interference or jamming or similar), and synchronize them to a GPS clock which is currently identified as accurate. The methods of the invention mitigate the vulnerability of the GPS system, while maintaining the benefits of accurate timing of GPS clock which have no disturbance. Accordingly, method for robust GPS synchronization between nodes in a network having local GPS receivers are attained.

The system basically has two operational mechanisms:

The first is a system and method which use a two-way transfer mechanism to compare the local clock to the clocks in the other stations/network nodes in the group/system. This group/system may comprise all clocks within a certain number of hops, such as one or two hops of the local clock, or within a predetermined physical area. The group may also be a pre-configured group. A two-way time transfer is established with the station and the other stations in the group. The time of the stations (nodes) are retrieved and compared to define which clocks are with the group of accurate clocks, and which are not, in view of a tolerance. The tolerance is typically set by the application, and may be known to (such as stored in the memory of) the station. The comparison of the clocks, the identification of a correct group, and the identification if a local clock is within said correct group or not can be done in a central node or by each station. In the case of a central node/station, the central station informs a station if it is belonging to the group of accurate clocks or to the group of inaccurate clocks. The station then sets the priority according to the instruction from the central node. The priority may be set to low if the clock is determined as not belonging to the group of accurate clocks, and set to high (or maintained at high) if the clock is determined to belong to the group of accurate clocks. If instructed to set the priority to low, the instructed station will also select a remote clock in the group of accurate clocks (high priority clocks) to which it will adjust the time of its own local clock, based on for example the distance and quality of the remote clock. If instructed to set the priority to high, the instructed station will keep the time of the local clock until the next comparison is made. In the next comparison, the clocks previously determined as low priority may be assumed to have high priority until again determined to be low.

In the case of that all stations determine their own clock status; each station receives remote times from the other nodes in an area, group or system, where the group/system may comprise all clocks within a certain number of hops, within a predetermined physical area, or be a pre-configured group, and decides locally if it belongs to the group of accurate clocks or to the group of inaccurate clocks. Deciding which nodes that have accurate clocks is performed by looking at the times of the remote stations and the local time of the current node, and finding a group where the times are the same, within a tolerance range, and thus decided as being accurate (belonging to the group of accurate clocks). If the information of the different times from the remote stations do not arrive at the same time, in a shift the local clock will operate as a free running clock not being phase locked to other clock sources, and the local clock is used to interpret previous received clocks. This is performed by doing a "dead count" on the time based on the local clock. The frequency of performing the method, of checking the accuracy of the local clock in view of the remote clocks, depends on the tolerance, quality and stability of internal clocks, as well as the demands of the applications running. Typically, the check of the remote stations is done on the level of the PTP algorithm, which is in the range of once every 1-2 seconds.

The second operational mechanism is a time distribution system, like IEEE 1588, that selects the clock based on priorities, quality, hops etc. This system operates in the modes of: 1) by default, the local clocks have the highest priority 2) within the group (or sub area), there can be several masters active at the same time, 3) which clock that is used if the local clock is disqualified (determined as inaccurate compared to the other clocks) is decided by the time distribution protocol. Basically, the closest clock (least number of hops) with the best quality will be selected.

The invention will now be described with reference to various embodiments implemented in a system of the invention.

Figure 4:
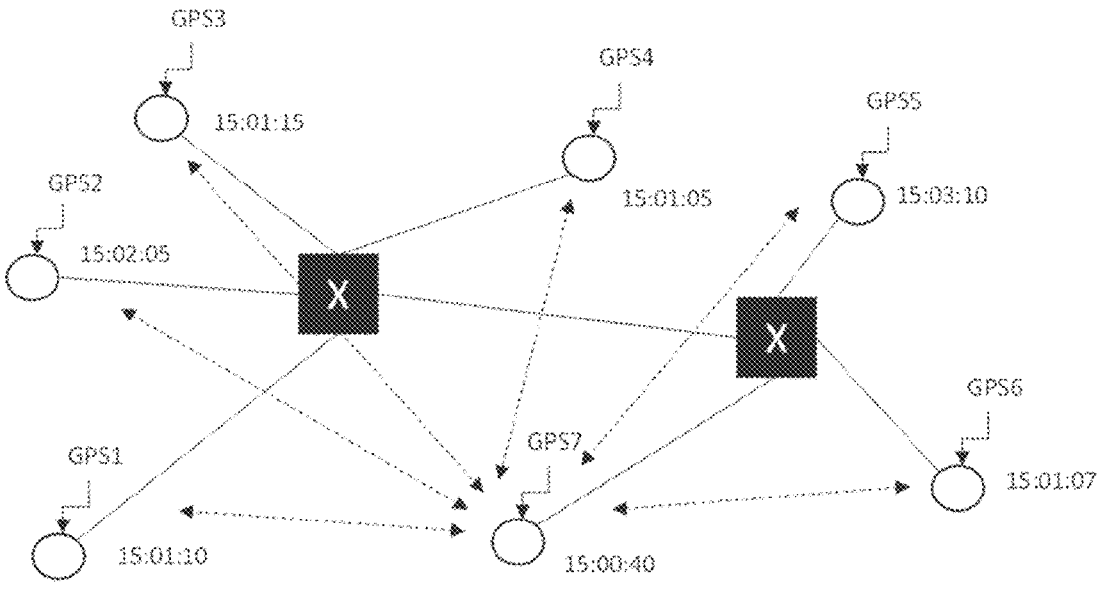
FIG. 4 illustrates an embodiment of the present invention using a distributed approach.

FIG. 4 depicts a general overview of the present invention according to an embodiment. In the depicted example showing a distributed system, a group of stations, the stations being named Station 1 to 7 and each having a related GPS clock GPS1-GPS7, respectively, are synchronized according to a method of the invention. The X'es representing respective switches connecting some of the nodes. Each station the group performs a check if its internal clock is possible to trust, e.g. if its GPS connection to the local clock is functional. The method is exemplified from the perspective of station 7. The station 7 with clock GPS7 has two-way time transfer connectivity with the other stations (nodes) in the group. It receives the time from the remote (REM) Stations 1 to 6 (REM1 to REM6), adds the local clock of GPS7, and compares all clocks, where the clocks/times of the Stations 1-6 (GPS1 to GSP6) when received at the Station 7 are referred to as (REM1 to REM6). In the present example, it can be seen that REM1, REM3, REM4 and REM6 (underlined) have the same time within a tolerance of 00:00:10, which is then considered as the correct time, i.e. the clocks GPS1, GPS3, GPS4 and GPS6 are determined as belonging to the group of accurate clocks. The times GPS7, REM2, REM5 are not, when compared to the times of the other clocks of the group, within the tolerance range of 00:00:10, and are then considered as inaccurate, and the clocks GPS7, GPS2, and GPS5 determined as belonging in the group of inaccurate clocks. Since GPS7 is inaccurate, it is assigned low priority by station 7. REM2 and REM5 will also be assigned low priority by the station 2 and station 5, respectively, i.e. a station will set its own clock priority to low (either by performing the method in the station, or by being instructed by a central node performing the method).

The tolerance range or interval being used to define the group of stations having accurate GPS clocks, i.e. that have the highest priority, and which will subsequently be used for synchronization/clock recovery, is basically the tolerance that is needed for the application performed by/in the station. For example, if the system is used for 5G CoPM, where the accuracy is 100 ns, the tolerance interval to define the group of accurate clocks is 100 ns. If it is digital terrestrial TV (DTT) such as SFN DVB-T, where the accuracy is 1 us, the tolerance interval is set to 1 us.

Figure 5:
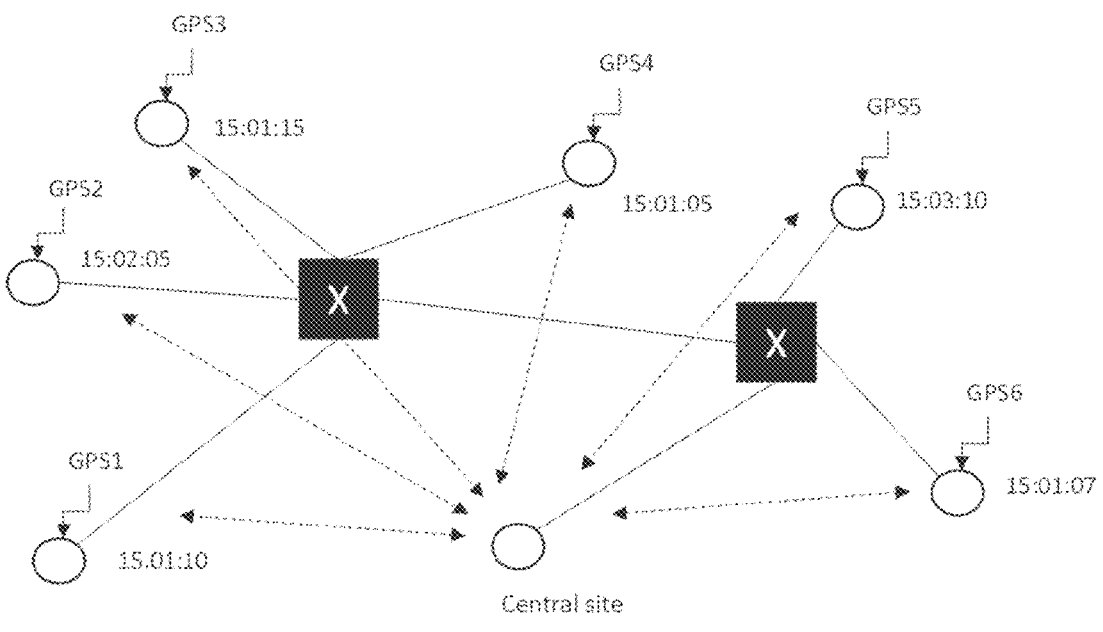
FIG. 5 illustrates an embodiment of the present invention using a centralized approach.

FIG. 5 depicts a general overview of the present invention according to an embodiment. In a centralized system, as depicted in FIG. 5, the method is performed similarly to the example in FIG. 4, in that the central site receives information from the stations in the group and compares them. The central site (central node) decides which of the stations 1-6 that have clocks within the tolerance of the group (hence belonging to the group of accurate clocks) and which are outside of the tolerance range (not belonging to the group of accurate clocks). To the stations which are classified as having clocks not belonging to the group of accurate clocks, the central node sends and instruction to reduce the priority of their respective clock.

The calculations in the distributed and centralized systems are performed frequent, e.g. with an interval of once every second. The frequency can be increased to reduce the time of outage, but with more messages, the burden on the network and the stations to process might increase significantly. Hence, the frequency may be adapted based on the traffic load in the network.

The decision of which stations are considered as "accurate" (showing accurate time) and which are "inaccurate", is performed by identifying groups of stations with clocks within the given tolerance. In a real installation, it is possible that there might be several groups that can be formed within the tolerance. In that case arbitration might be used in the sense of selecting the largest group if multiple groups are identified. Note that it is not needed that the selected group comprise the majority of the GPS'es in the original group/area assessed (the majority may be outside of the tolerance). Alternatively, it can be that several qualities of clock are used and then a group with a high-quality clock within the group is selected as the group of accurate clocks. It may then be selected as the group that have GPS clocks at highest priority, and that is used by all stations when selecting a clock to adjust to.

Figure 6:
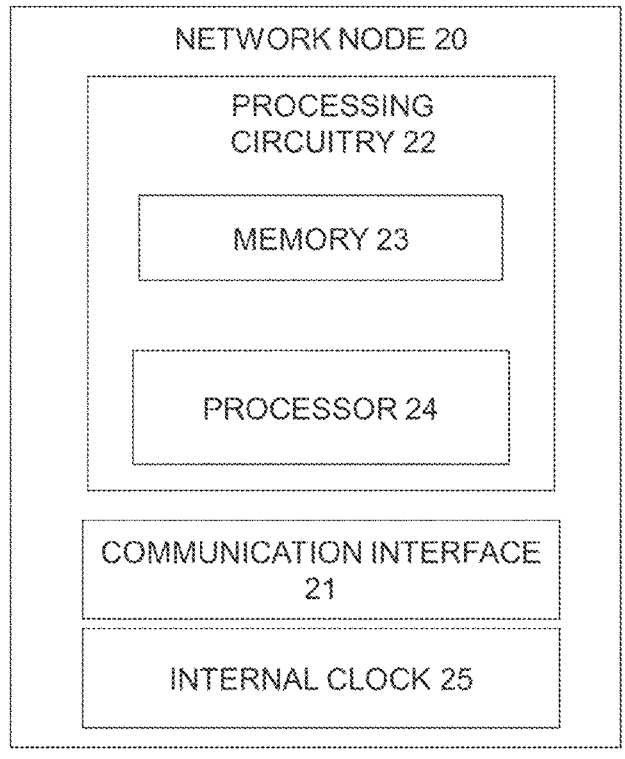
FIG. 6 is a block diagram of a node of the invention.

FIG. 6 illustrates a block diagram of a network node (20) of the invention. The network node comprises a communications interface 21 (e.g. a radio communication interface or radio circuitry or network interface) 21, configured to receive and transmit any form of communications or control signals within a network, e.g. for connecting the node to at least one neighboring node, such as a master or slave node, and for sending and receiving data over transport links. It should be appreciated that the communication interface 21 is according to some aspects comprised as any number of transceiving, receiving, and/or transmitting units or circuitry. It should further be appreciated that the communication interface 21 can e.g. be in the form of any input/output communications port known in the art. It may comprise RF circuitry and baseband processing circuitry (not shown).

The node further comprises processing circuitry 22 comprising a memory 23 and a processor 24 being configured to carry out the method of the invention. The node according to some aspects further comprises at least one memory unit or circuitry 23 that is in communication with the communication interface/radio circuitry 21. The memory 23 can e.g. be configured to store received or transmitted data and/or executable program instructions. The memory 23 is e.g.

configured to store any form of contextual data. The memory 23 can e.g. be any suitable type of computer readable memory and can e.g. be of volatile and/or non-volatile type. The memory may for example log received time stamps or tolerance ranges. The network node 20 further comprises processing circuitry 22 which is configured to cause the network node 20 to carry out the methods of the invention.

The processing circuitry 22 is e.g. any suitable type of computation unit, e.g. a microprocessor, Digital Signal Processor, DSP, Field Programmable Gate Array, FPGA, or Application Specific Integrated Circuit, ASIC, or any other form of circuitry. It should be appreciated that the processing circuitry need not be provided as a single unit but is according to some aspects provided as any number of units or circuitry. The processing circuitry may thus comprise both a memory 23 for storing a computer program and a processor 24, the processor being configured to carry out the method of the computer program.

The controller, CTL, or processing circuitry 22 is according to some aspects capable of executing computer program code. The computer program is e.g. stored in a memory, MEM, 23. The memory 23 can be any combination of a Read And write Memory, RAM, and a Read Only Memory, ROM. The memory 23 in some situations also comprise persistent storage, which, for example, can be any single one or combination of magnetic memory, optical memory, or solid state memory or even remotely mounted memory. It should be appreciated that the processing circuitry need not be provided as a single unit but is according to some aspects provided as any number of units or circuitry.

The node may comprise an internal clock 25, and may be able to provide and store timestamps in relation to said internal clock, and store time stamps in relation to other nodes. The node also comprises or is connected to a GPS receiver 26 (not shown).

The proposed methods according to a first and second embodiment will now be described in more detail referring to FIGS. 7 and 8. It should be appreciated that FIGS. 7 and 8 comprise some operations and modules which are illustrated with a solid border and some operations and modules which are illustrated with a dashed border. The operations and modules which are illustrated with solid border are operations which are comprised in the broadest example embodiment. The operations and modules which are illustrated with dashed border are example embodiments which may be comprised in, or a part of, or are further embodiments which may be taken in addition to the operations and modules of the broader example embodiments. It should be appreciated that the operations do not need to be performed in order, and that different embodiments are covered by the method comprising steps A and B. Furthermore, it should be appreciated that not all of the operations need to be performed.

Figure 7:
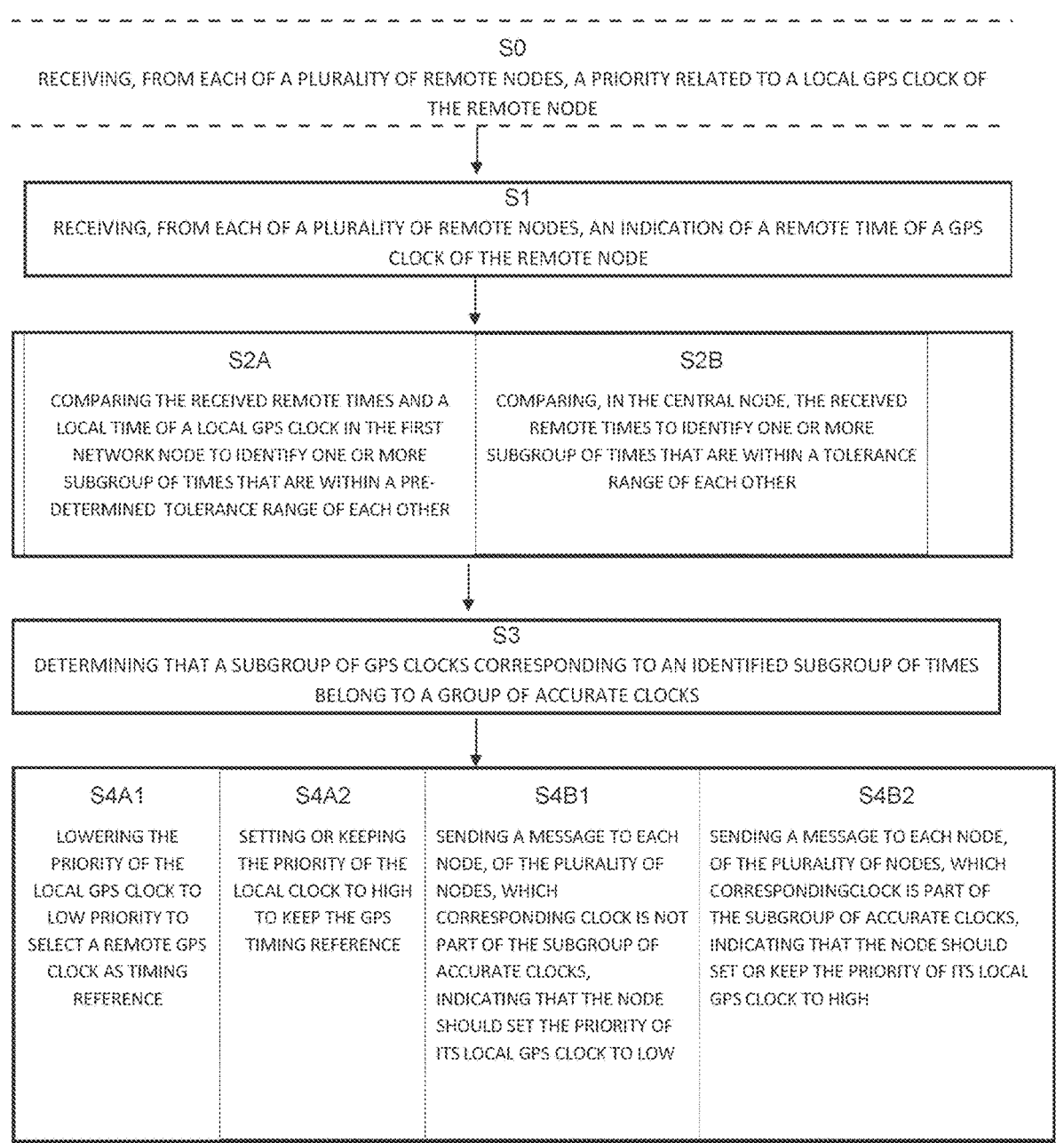
FIG. 7 shows a flowchart of an exemplary process for setting the priorities of the present invention, either using a distributed method (A) or a centralized method (B).

FIG. 7 illustrates a method for setting priorities of a number of GPS clocks, for enabling robust and exact synchronization between nodes in a network, the method comprising: receiving (S1), from each of a plurality of remote nodes, an indication of a remote time of a GPS clock of the remote node. The method may be performed either in a local node to be synchronized on in a centralized node. In the event of the method being carried out in a local first node to be synchronized, method A, i.e. on a condition that the first node is a node comprising a local GPS clock to be synchronized with the plurality of nodes, comparing (S2A) the received remote times and a local time of a local GPS clock in the first node to identify one or more subgroup of times that are within a tolerance range of each other, and determining (S3A) that a subgroup of GPS clocks corresponding to an identified subgroup of times belong to a group of accurate clocks. On a condition that the GPS clock of the first node is not within the group of accurate clocks, lowering or setting (S4A1) the priority of the local GPS clock to low priority to select a remote GPS clock as timing reference, or, on a condition that the GPS clock of the first node is within the group of accurate clocks, setting or keeping (S4A2) the priority of the local clock to/at high.

In the event of the method being carried out in a centralized first node to be used for synchronizing other nodes, method B, i.e. on a condition that the first node is a central node for enabling synchronization between the plurality of nodes, comparing (S2B), in the central node, the received remote times to identify one or more subgroup of times that are within a tolerance range of each other, determining (S3B) that a subgroup of GPS clocks corresponding to an identified subgroup of times belong to a group of accurate clocks, sending (S4B1) a message to each node, of the plurality of nodes, which corresponding clock is not part of the subgroup of accurate clocks, indicating that the node should set the priority of its local GPS clock to low; and sending (S4B2) a message to each node, of the plurality of nodes, which corresponding clock part of the subgroup of accurate clocks, indicating that the node should set the priority of its local GPS clock to high.

Figure 8:
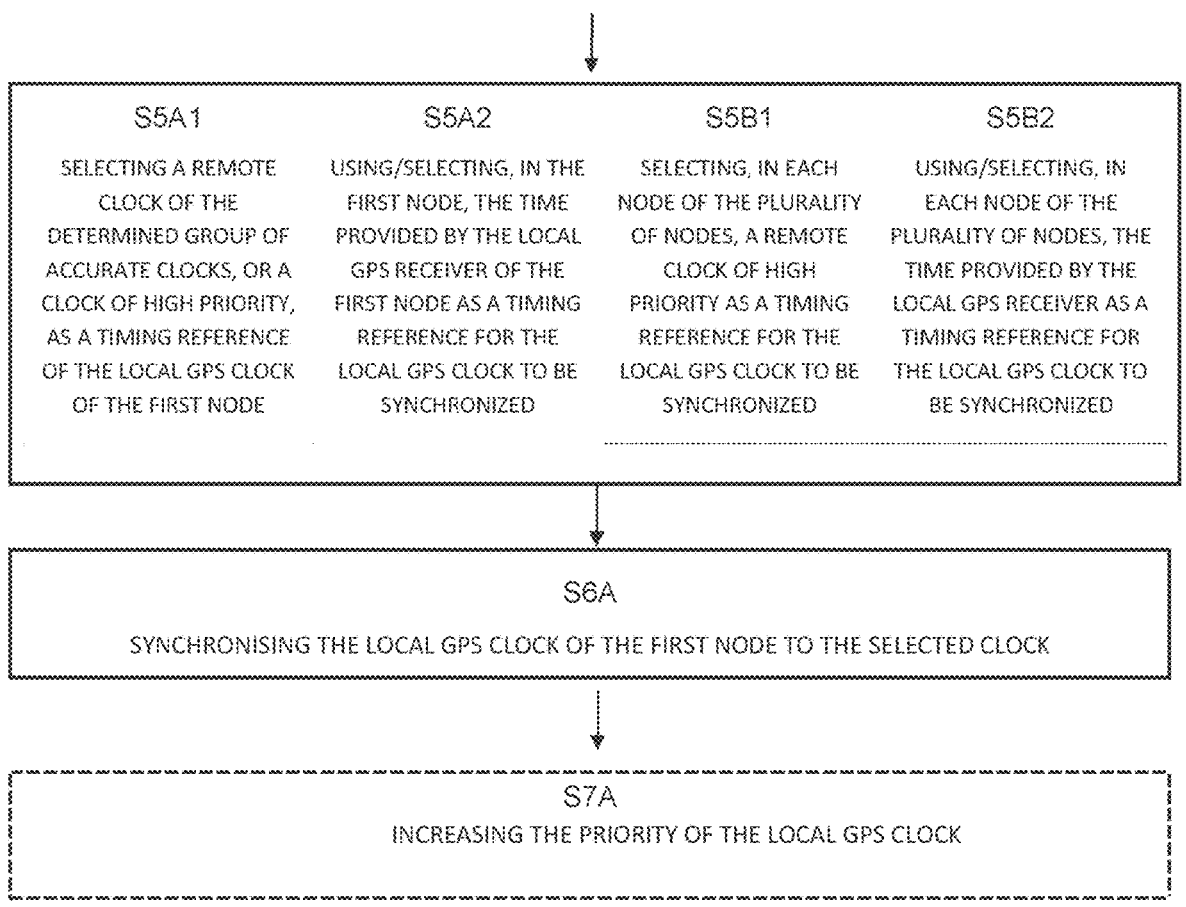
FIG. 8 shows a flowchart of an exemplary process for selecting a clock to synchronize to, based on the method of FIG. 7.

FIG. 8 illustrates a method for selecting a clock to synchronize to, for enabling robust and exact synchronization between nodes in a network, the method comprising: on a condition that the GPS clock of the first node is not within the group of accurate clocks, selecting (S5A1) a remote clock of the determined group of accurate clocks as a timing reference of the local GPS clock of the first node, synchronising (S6A) the local GPS clock of the first node to the selected clock, and optionally increasing (S7A) the priority of the local GPS clock. The priority of the local clock may be reset to high after a remote clock has been selected or increased to medium, such that it may be used in the next comparison of clocks, but not used for another clock to slave upon. Alternatively, the priority may be increased to high just before, or at the time of, the next comparison, or after the next comparison has determined that the clock is in the group of accurate clocks. On a condition that the GPS clock of the first node is within the group of accurate clocks, the method comprises: setting (S4A2) the priority of the local clock to high and using or selecting (S5A2) the time provided by the local GPS receiver of the first node for the local GPS clock to be synchronized. The method may either be performed as a continuation of the method A in the local first node, or, in case the method B has been performed in a centralized node, the first node being a central node for enabling synchronization between a plurality of nodes, the method of FIG. 8 may subsequently be performed in any (or all) of the plurality of nodes which has received an indication to lower its priority from the central node, i.e. to search for a remote clock to slave upon. Nodes that has received an indication to keep or set the priority to high will then keep the synchronization of their local clock to the local GPS. Receiving an indication to lower the priority may trigger the method of FIG. 8 to be carried out in the receiving node. In another option, receiving an indication to lower the priority may trigger the full method A of FIG. 7 and the method of FIG. 8. In one embodiment, upon the central sending (S4B1) a message to each node, of the plurality of nodes, which corresponding clock is not part of the subgroup of accurate clocks, indicating that the node should set the priority of its local GPS clock to low, a method may be carried out in each of the receiving nodes: receiving a message node should set the priority of its local GPS clock to low, and selecting (S5B1), in each node of the plurality of nodes, a remote clock of high priority as a timing reference for the local GPS clock to be synchronized. In another embodiment, upon the central sending (S4B2) a message to each node, of the plurality of nodes, which corresponding clock part of the subgroup of accurate clocks, indicating that the node should set the priority of its local GPS clock to high, a method may be carried out in each of the receiving nodes: receiving a message node should set the priority of its local GPS clock to hight, and using or selecting (S5B2), in each node of the plurality of nodes, the time provided by the local GPS receiver as a timing reference for the local GPS clock to be synchronized.

The method A above may also comprise, as a first step, receiving (S0A) from each of a plurality of remote nodes, a priority related to a local GPS clock of the remote node, where the priorities are being set by each node based on an assessment whether the local GPS clock show a correct time or not.

In the method of FIG. 7 above, receiving (S1), from each of a plurality of remote nodes, a remote time of a local GPS clock of the remote node includes:

sending (S1$a$) a signal comprising a local timestamp t1 to the plurality of remote nodes, the timestamp t1 relating to a time in the first node when the signal was sent in relation to a local clock in the first node, receiving (S1$b$) from each of the plurality of nodes, a second timestamp t2, the timestamp t2 relating to a time in the remote node when the signal was received in the remote node in relation to a local clock in the remote node, determining (S1$c$) for each of the plurality of remote nodes, a remote time based on the timestamps t1, t2 and an average delay between the first node and the remote node.

Further, comparing (S2) the times, the times being (S2A) the remote times and the local time or (S2B) the remote times (S2B), to identify one or more subgroup of times that are within a pre-determined tolerance range of each other comprises: comparing each time of the times to each one of the other times to determine if said time is within the tolerance range of the other time, and grouping all times being within the tolerance range of each other into identified subgroups. Even further, determining (S3) that that a subgroup of GPS clocks corresponding to an identified subgroup of times belong to a group of accurate clocks comprises: on a condition that one subgroup is identified, determining (S31) the identified subgroup of GPS clocks as belonging to a group of accurate clocks, on a condition that more than one subgroup is identified, determining (S321) that the identified subgroup of GPS clocks which contains the greatest number of GPS clocks is belonging to a group of accurate clocks, or determining (S322) that the identified subgroup of GPS clocks which contains a clock of highest quality is belonging to a group of accurate clocks.

Further, in the methods above, selecting (S5A1) a remote clock of the determined group of accurate clocks as a timing reference of the local GPS clock of the first node comprises: on a condition that the group comprises a high quality clock, selecting (S5A11) the high quality clock as a timing reference of the local GPS clock of the first node, on a condition that the group does not comprise a high quality clock, selecting (S5A121) the remote clock in the identified subgroup being closest in distance, in view of number of hops or physical distance, to the local GPS clock of the first node as a timing reference of the local GPS clock of the first node, on a condition that more than one clock is within equal distance of the clock of the first node, selecting (S5A122) the GPS clock in the identified subgroup being closest in distance to the GPS clock of the first node and which has the highest priority as a timing reference of the local GPS clock of the first node.

In some aspects of the method, the tolerance range is set based on the requirements of the application currently being performed by the first node or the plurality of nodes to be synchronized. The tolerance range may be pre-determined based on the application running in the node, where the node may be aware of the requirements for each application, such as stored in the memory of the node.

The first node (20) is selected from the group of a 5G base station, gNode B, 5G small cell, eNode B, Node B, digital TV-transmitter, power station in smart grid, a data communication equipment, and a data terminal equipment.

In one aspect is provided a first node (20), comprising processing circuitry (22) configured to for enabling robust GPS synchronization between nodes in a network (100), the node (20) comprising: a communication interface (21); an internal clock (25); a GPS receiver (26); processing circuitry (22) including a memory (23) and processor (24) configured to cause the node (20) to carry out the methods described above.

Further is provided a method performed in a system comprising a network of nodes, for enabling synchronization between a plurality of nodes in the network of said system, each of the plurality of nodes being connected to a local GPS clock, the method comprising: performing, by the plurality of nodes in an area of the network, any one of the methods described above, for identifying inaccurate local GPS clocks and enabling clock recovery of said inaccurate clocks to obtain synchronization.

In another aspect is provided a system, comprising a network (100) and a plurality of nodes (20), the system being configured to cause the nodes (20) to carry out any one of the methods above.

According to some aspects, the disclosure relates to a computer program comprising computer program code which, when executed, causes a network node to execute the methods described above and below. In other aspects, the disclosure relates to a carrier containing the computer program, wherein the carrier is one of an electronic signal, optical signal, radio signal, or computer readable storage medium.

The content of this disclosure thus enables synchronization for a plurality of nodes in a network, which is exact due to the use of GPS clocks, and robust due to the recovery method provided in the present disclosure.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, nodes, networks and systems. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, and that several "means", "units" or "nodes" may be represented by the same item of hardware.

In all embodiments of the invention there is a common aspect that the method comprises comparing a group or set of GPS clocks in an area, and determine, based on tolerance, which clocks that are accurate, and which are not, which information may be used for clock recovery and synchronization of the nodes in the network.

Even though the invention has been described in relation to embodiments disclosing certain nodes and networks, it would be possible for the person skilled in the art, based on the present disclosure, to apply the present invention of synchronization for any, network having access to GPS clocks, even if not specifically disclosed in the present disclosure. In some embodiments, the majority but not all clocks participating in the methods of the invention need to be GPS linked.

The person skilled in the art realizes that the present invention by no means is limited to the embodiments described above. On the contrary, many modifications and variations are possible within the scope of the appended claims. For example, embodiments of the invention may be based on other network technologies than 5G RANs.

The invention claimed is:

1. A method for use in a first node, for enabling synchronization between nodes in a network, the network including the first node and a plurality of remote nodes, the method comprising:

receiving remote times from the plurality of remote nodes based on receiving, from each remote node of the plurality of remote nodes, an indication of a remote time of a respective local global positioning system (GPS) clock of the remote node;

on a condition that the first node is a node comprising a local GPS clock to be synchronized with the plurality of remote nodes, comparing the received remote times and a local time of the local GPS clock of the first node to identify one or more subgroups of times that are within a tolerance range of each other, determining that a subgroup of GPS clocks corresponding to at least one subgroup of times, among the one or more subgroups of times, belongs to a group of accurate clocks, on a condition that the local GPS clock of the first node is not within the group of accurate clocks, lowering a priority of the local GPS clock of the first node to a low priority, selecting a remote GPS clock of the group of accurate clocks, or a remote GPS clock which has a high priority, as a timing reference of the local GPS clock of the first node, and synchronising the local GPS clock of the first node to the selected remote GPS clock, and on a condition that the local GPS clock of the first node is within the group of accurate clocks, setting the priority of the local GPS clock of the first node to high, and using a time provided by a local GPS receiver of the first node for the local GPS clock of the first node to be synchronized; and on a condition that the first node is a central node for enabling synchronization between the plurality of remote nodes, comparing, in the central node, the received remote times to identify one or more separate subgroups of times that are within the tolerance range of each other, determining that a separate subgroup of GPS clocks corresponding to a separate subgroup of times, among the one or more separate subgroups of times, belongs to the group of accurate clocks, sending a particular message to each particular remote node of the plurality of remote nodes that has a corresponding local GPS clock that is not part of the group of accurate clocks, the particular message indicating that the particular remote node should set a priority of the corresponding local GPS clock of the particular remote node to low, and sending a separate message to each separate remote node of the plurality of remote nodes that has a corresponding local GPS clock that is part of the group of accurate clocks, the separate message indicating that the separate remote node should set a priority of the corresponding local GPS clock of the separate remote node to high.

2. The method according to claim 1, further comprising:

receiving, from each remote node of the plurality of remote nodes, a respective priority related to a respective local GPS clock of the remote node, where the respective priority is set by the remote node based on an assessment whether the respective local GPS clock shows a correct time or not.

3. The method according to claim 1, wherein the receiving, from each remote node of the plurality of remote nodes, the indication of the remote time of the respective local GPS clock of the remote node includes:

sending a signal comprising a local timestamp t1 to the plurality of remote nodes, the local timestamp t1 relating to a time in the first node when the signal was sent in relation to the local GPS clock in the first node;

receiving, from each remote node of the plurality of remote nodes, a respective second timestamp t2 corresponding to the remote node, the respective second timestamp t2 relating to a time in the remote node when the signal was received in the remote node in relation to a local GPS clock in the remote node; and determining, for each remote node of the plurality of remote nodes, a remote time based on the local timestamp t1, the respective second timestamp t2 corresponding to the remote node, and an average delay between the first node and the remote node.

4. The method according to claim 1, wherein, the tolerance range is a pre-determined tolerance range, the comparing the received remote times and the local time of the local GPS clock in the first node to identify the one or more subgroups of times that are within the tolerance range of each other, on the condition that the first node comprises the local GPS clock to be synchronized with the plurality of remote nodes, includes comparing each time of the received remote times and the local time of the local GPS clock to each other time of the received remote times and the local time of the local GPS clock to determine if said time is within the tolerance range of the other time, and grouping all times of the received remote times and the local time of the local GPS clock that are within the tolerance range of each other into the one or more subgroups, and the comparing, in the central node, the received remote times to identify the one or more separate subgroups of times that are within the tolerance range of each other, on the condition that the first node is the central node for enabling the synchronization between the plurality of remote nodes, includes comparing each time of the received remote times to each other time of the received remote times to determine if said time is within the tolerance range of the other time, and grouping all times of the received remote times that are within the tolerance range of each other into the one or more separate subgroups.

5. The method according to claim 1, wherein each of the determining that the subgroup of GPS clocks corresponding to the at least one subgroup of times, among the one or more subgroups of times, belongs to the group of accurate clocks and the determining that the separate subgroup of GPS clocks corresponding to the separate subgroup of times, among the one or more separate subgroups of times, belongs to the group of accurate clocks comprises:

on a condition that one subgroup of GPS clocks is identified, determining that the one subgroup of GPS clocks belongs to the group of accurate clocks; and on a condition that more than one subgroup of GPS clocks is identified, determining that a subgroup of GPS clocks, of the more than one subgroup of GPS clocks, which contains a greatest number of GPS clocks belongs to the group of accurate clocks; or determining that a subgroup of GPS clocks, of the more than one subgroup of GPS clocks, which contains a clock of highest quality belongs to the group of accurate clocks.

6. The method according to claim 1, wherein the selecting the remote GPS clock of the group of accurate clocks as the timing reference of the local GPS clock of the first node comprises:

on a condition that the group of accurate clocks comprises a high-quality clock, selecting the high-quality clock as the timing reference of the local GPS clock of the first node;

on a condition that the group of accurate clocks does not comprise a high quality clock, selecting a particular remote GPS clock, in the one or more subgroups of times that are within the tolerance range of each other, that is closest in distance, in view of number of hops or physical distance, to the local GPS clock of the first node as the timing reference of the local GPS clock of the first node; and on a condition that more than one clock is within equal distance of the local GPS clock of the first node, selecting a particular GPS clock, in the one or more subgroups of times that are within the tolerance range of each other, that is closest in distance to the local GPS clock of the first node and which has a highest priority as the timing reference of the local GPS clock of the first node.

7. The method according to claim 1, wherein the tolerance range is set based on requirements of an application currently being performed by the first node or the plurality of remote nodes to be synchronized.

8. The method according to claim 1, wherein the tolerance range is pre-configured, received via a central node, acquired using artificial intelligence or determined via lookup table.

9. The method according to claim 1, wherein the first node is one of a 5G base station, gNode B, 5G small cell, eNode B, Node B, digital TV-transmitter, power station in smart grid, a data communication equipment, or a data terminal equipment.

10. A first node, configured for enabling robust GPS synchronization between nodes in a network, the first node comprising:

a communication interface;

an internal clock;

a GPS receiver; and processing circuitry including a memory and processor configured to cause the first node to carry out the method according to claim 1.

11. A method performed in a system comprising a network of nodes, for enabling synchronization between a plurality of nodes in the network of said system, each of the plurality of nodes being connected to a respective local GPS clock, the method comprising:

performing, by the plurality of nodes in an area of the network, the method of claim 1, for identifying inaccurate local GPS clocks and enabling clock recovery of said inaccurate local GPS clocks to obtain synchronization.

12. A system, comprising a network and a plurality of nodes, the system being configured to cause the nodes to carry out the method according to claim 1.

13. A non-transitory computer readable medium storing a computer program comprising computer program code which, when executed in a network node, causes the network node to execute the method according to claim 1.

* * * * *